(12) United States Patent
Kissling

(10) Patent No.: US 10,313,507 B2
(45) Date of Patent: Jun. 4, 2019

(54) MONITORING SYSTEM FOR A CELLULAR TELEPHONE NETWORK

(71) Applicant: Systems and Software Enterprises, LLC, Brea, CA (US)

(72) Inventor: Christian Kissling, Germering (DE)

(73) Assignee: Systems and Software Enterprises, LLC, Brea, CA (US)

( * ) Notice: Subject to any disclaimer, the term of this patent is extended or adjusted under 35 U.S.C. 154(b) by 0 days.

(21) Appl. No.: 15/923,903

(22) Filed: Mar. 16, 2018

(65) Prior Publication Data

US 2018/0270345 A1    Sep. 20, 2018

Related U.S. Application Data

(60) Provisional application No. 62/472,227, filed on Mar. 16, 2017.

(51) Int. Cl.
*H04W 24/04*    (2009.01)
*H04M 1/725*    (2006.01)
*H04W 24/08*    (2009.01)

(52) U.S. Cl.
CPC ....... *H04M 1/72577* (2013.01); *H04W 24/04* (2013.01); *H04W 24/08* (2013.01); *Y02D 70/00* (2018.01); *Y02D 70/10* (2018.01); *Y02D 70/12* (2018.01); *Y02D 70/122* (2018.01); *Y02D 70/124* (2018.01); *Y02D 70/1242* (2018.01); *Y02D 70/1262* (2018.01)

(58) Field of Classification Search
CPC ......... H04W 24/04; H04W 24/08; G01S 7/38; H04K 3/42; H04K 3/825
See application file for complete search history.

(56) References Cited

U.S. PATENT DOCUMENTS

| | | | | |
|---|---|---|---|---|
| 2002/0064146 A1* | 5/2002 | Okuyama | .......... | H04B 1/70735 370/342 |
| 2004/0185815 A1* | 9/2004 | Fukuda | .................. | H04B 1/123 455/296 |
| 2014/0364053 A1* | 12/2014 | Schirrmacher | .... | H04B 7/18506 455/1 |
| 2017/0366250 A1 | 12/2017 | Ovens et al. | | |

FOREIGN PATENT DOCUMENTS

| | | | |
|---|---|---|---|
| EP | 1867203 B1 | 11/2010 | |
| EP | 2 052 565 B1 | 3/2012 | |
| GB | 2425019 A | 10/2006 | |
| WO | 2006107725 A2 | 10/2006 | |
| WO | 2006127771 A1 | 11/2006 | |
| WO | 2008005098 A2 | 1/2008 | |
| WO | 2017083238 A1 | 5/2017 | |

* cited by examiner

*Primary Examiner* — Charles N Appiah
*Assistant Examiner* — Xiang Zhang
(74) *Attorney, Agent, or Firm* — Umberg Zipser LLP

(57) ABSTRACT

Systems and methods are described herein for monitoring an on-board cellular network infrastructure. In one aspect, a controller and one or more noise generation units can be used to inhibit passenger devices from connecting to ground-based cellular stations while on-board. The noise generation unit can be configured to generate a noise signal. If a loss of power to an on-board cell station is identified, the noise generation can generate a different noise signal in response.

13 Claims, 1 Drawing Sheet

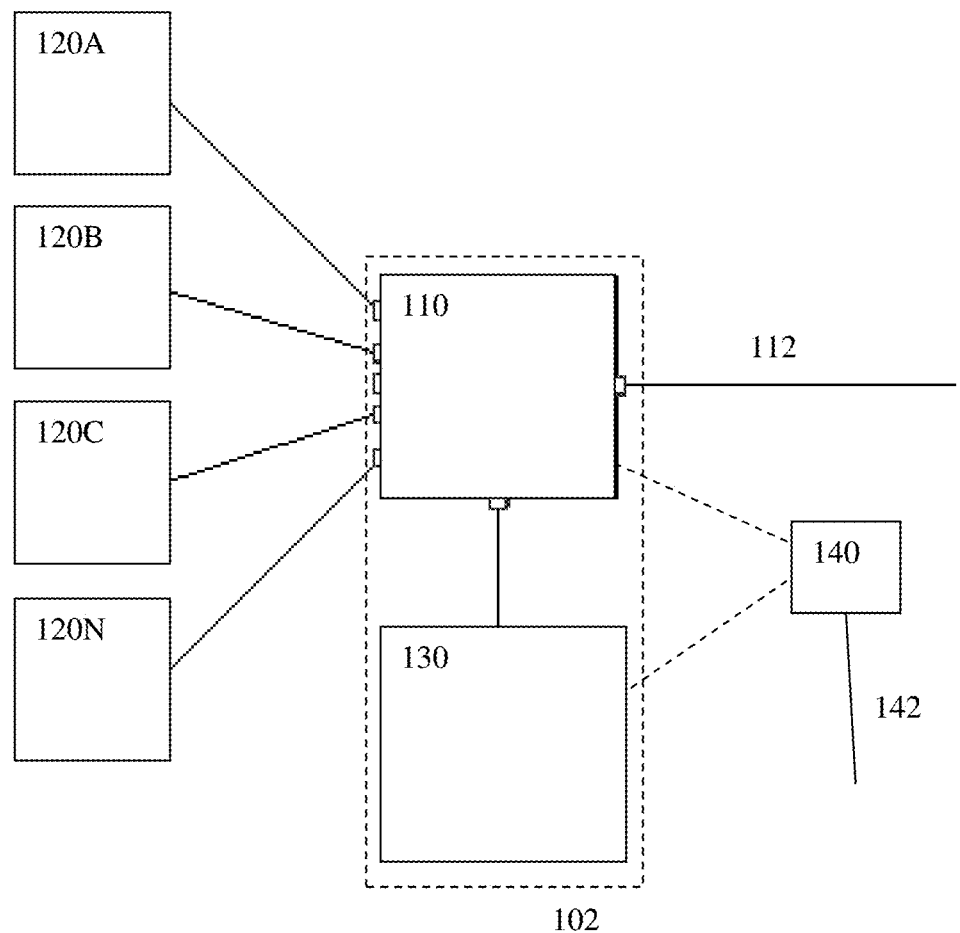

MONITORING SYSTEM FOR A CELLULAR TELEPHONE NETWORK

This application claims priority to U.S. provisional application having Ser. No. 62/472,227 filed on Mar. 16, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is monitoring systems for cellular telephone systems, including, for example, GSM, UMTS, and/or LTE networks.

BACKGROUND

The background description includes information that may be useful in understanding the present invention. It is not an admission that any of the information provided herein is prior art or relevant to the presently claimed invention, or that any publication specifically or implicitly referenced is prior art.

Due to regulatory issues, it is currently necessary to prevent connection of cell phones in use on an aircraft to ground-based network rather than to on-board cellular base stations. Typically this is achieved by transmission of a noise signal by a dedicated system. Such systems are typically implemented using a network control unit (NCU), which includes a general control system that controls, configures, and monitors various noise generating units. Failure of such components can result in non-permitted connection of on-board cell phones to ground networks.

Typically, failure of the general control system is detected by expiration of a watchdog pulse. If the time span between two watchdog pulses arriving at a local network control unit exceeds a defined and configurable threshold, the network control unit will detect a system failure. Alternatively, the network control unit can detect the failure of the general controlling system by measuring the input power in a configurable frequency range, i.e. in particular the frequency range of the on-board cell. If the measured input power falls below a threshold, the network control unit detects a failure.

Generally the network control unit deactivates all noise generation units after expiration of the time between watchdog pulses, or when insufficient input power is registered. This can cause a problem if the passenger cell phones are still switched on. Since the noise generation in the network control unit is directly deactivated, the UEs might try to establish a connection to a ground network and since noise is not generated they will likely succeed.

Thus, there is still a need for improved network control systems and methods that are configured to inhibit passengers from connecting to a ground network.

SUMMARY OF THE INVENTION

The inventive subject matter provides apparatus, systems and methods in which a network control unit is provided that includes a general controlling system and one or more noise generating units. Noise is broadcast within frequency ranges that prevent cell phones and similar devices in use on an aircraft from communicating with ground-based networks. On detection of a fault or failure in an on-board cellular base station or a network control unit component, the system dynamically transitions to a fallback configuration for the same noise generation unit that maintains noise generation and continues to prevent communication with ground-based networks. This is in contrast to other systems that may utilize two distinct noise generation units where one unit is utilized when the other fails. The present systems and methods allow for the same unit to change its configuration if problems are detected.

Systems and methods of the inventive concept provide a number of advantages over the prior art directed to prevention of unwanted attachment of on-board cell phones and similar devices to ground-based networks in the case of on-board cell failure or controlling system failure. For example, by activating a fallback configuration the cabin crew has sufficient time to ensure that all passengers have turned off such equipment. Once the passengers have deactivated their devices the entire system can then be switched off (for example, to permit rebooting of the system or system components)—including noise generation.

Various objects, features, aspects and advantages of the inventive subject matter will become more apparent from the following detailed description of preferred embodiments, along with the accompanying drawing FIGURES in which like numerals represent like components.

BRIEF DESCRIPTION OF THE DRAWINGS

FIG. 1 is a schematic of a system for monitoring an in-vehicle cellular network.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following description includes information that may be useful in understanding the present invention. It is not an admission that any of the information provided herein is prior art or relevant to the presently claimed invention, or that any publication specifically or implicitly referenced is prior art.

FIG. 1 illustrates one embodiment of a system 100 for monitoring a cellular network. System 100 can include a network control unit 102 comprising a noise generation unit (NGU) 110 that is coupled with one or more cellular base stations 120A-120N. The base stations (i.e. on-board cells) could be configured to broadcast on a GSM, UMTS, LTE, or other cellular network. The network control unit 102 further comprises a general controlling system 130, which is configured to control, configure, and/or monitor the noise generation unit 110.

The network control unit 102 combines the desired signal(s), which can be in attenuated, non-attenuated, or amplified form, with the generated noise from noise generation unit 110, and outputs the generated noise using one more antenna(s) 112. Antenna(s) 112 can be of any commercially suitable type, and in preferred embodiments are leaky-line antennas and/or dipole antennas.

As shown, the general controlling system 130 is in communication with the noise generation unit 110. Such a general controlling system 130 can configure parameters into the noise generation unit 110 and/or can send a watchdog trigger to the noise generation unit 110 at regular intervals to indicate a health status.

System 100 can be utilized in different ways. In some embodiments, broadband noise is generated via the one or more noise generation unit 110, which overlaps with the frequency range of the wanted signal of an on-board cell (e.g., cell 120A). In other embodiments, broadband noise is generated via the one or more noise generation unit 110 in which noise in the frequency range of the wanted signal is attenuated and/or suppressed (e.g. by a "notch"). In still other embodiments, a broadband noise signal is generated via the one or more noise generation unit 110 in which essentially no noise is generated within the frequency range of the wanted signal (as opposed to a notch, in which the noise is only suppressed or attenuated).

In operation, system 100 via the noise generation unit 110 generates noise in order to prevent user equipment (e.g. a cellular phone or tablet computer) on board an airplane from establishing a connection with one or more terrestrial ground networks, such as GSM, UMTS and LTE networks.

It is contemplated that the system 100 activates a specific and dynamically configurable fallback-configuration using the noise generation unit 110 on failure of one or more components of the system 100. This is in contrast to prior art systems where all noise generators would be switched off upon detection of a system failure. Thus, using system 100, a specific subset of noise generators can remain in operation, or a previously defined pattern of broadband noise (as described above) implemented.

In another embodiment of the inventive concept, system 100 can detect a failure of the general controlling system 130 or other component of the network control unit 102 and/or an on-board cell (e.g., 120A, 120B, 120C, or 120N) using not only watchdog signals and/or power monitoring as system 100 inputs, but also by implementing a network listen function (NWL). When implementing such a network listen function, system 100 can include one or more measuring devices 140 that monitor a receiving antenna 142 for received power (i.e. broadcast power) from transmitting on-board cells 120A-120N. Such an antenna 142 can be a separate, dedicated antenna or a general antenna for general reception. By monitoring such received power, system 100 can detect failure of an on-board cell (e.g., one or more of cells 120A-120N) under conditions where the on-board cell is not directly connected to the system 100, but rather operated independently. In some embodiments, such configuration can be used in combination with direct monitoring of power supplied to on-board cells that are directly connected to system 100. The one or more measuring devices 140 can provide a signal to the controlling system 130, the noise generation unit 110 or other component of the network control unit 102 to effectuate the backup configuration discussed herein.

In still further embodiments, the noise generator unit 110 can be configured to generate noise in the entire frequency band under such circumstances (i.e. also in the channel which is used by the on-board cell(s)). In other embodiments, the noise generator unit 110 can be configured to continue generating noise, but does so using a specified fallback configuration.

It is also contemplated that should failure of the general controlling system 130 or one or more of the on-board cells 120A-120N be detected (by any of the above means), noise generation via unit 110 is not deactivated (as in the prior art), but rather a pre-configured backup configuration is loaded and implemented via noise generation unit 110. This could occur through a command from the controlling system 130, preconfigured in the noise generation unit 110, or via a remote controller. Such a backup configuration can specify power levels at which noise is generated by the NCU 110 in case of failure. This configuration can include deactivation of all noise generation units, but also allow the generation of noise with a reduced, conventional, or increased noise power/intensity.

Advantageously, system 100 provides for the generation of defined noise signal under both normal and detected failure conditions using the same noise generation hardware, thereby preventing unwanted detection of ground networks by passenger devices and the prevention of connection of on-board cell phones and similarly-equipped devices to ground networks.

It is further contemplated that in some embodiments noise generating unit 110 does not generate noise in a frequency range used by one or more on-board cells 120A-120N (e.g. where the noise signal includes a notch corresponding to such a frequency range). This approach can be chosen if the on-board cells 120A-120N have sufficient transmission power and activity to prevent detection of and/or connection to ground networks, for example. Under conditions where an on-board cell is in failure, an on-board cell phone or similar device might attempt to connect to a ground network operating in the frequency range where noise is suppressed by a notch. In these circumstances where failure has occurred, a fallback configuration of the noise generation unit 110 can be activated and switch the unit 110 to generate noise within the frequency range of the notch and thus prevent detection of and/or connection to ground-based systems by an on-board cell phone.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for monitoring a cellular network on board an aircraft, comprising:
   providing a network control unit comprising a general control system operatively linked to a noise generation unit;
   generating a first noise signal using the noise generation unit, wherein the first noise signal has a first signal configuration;
   monitoring power supplied to or received from at least one of a plurality of on-board cellular base stations;
   identifying a loss of power supplied to or received from the at least one of a plurality of cellular base stations; and
   on identifying the loss of power supplied to or received from the at least one of a plurality of cellular base stations, generating via the noise generation unit a second noise signal having a second signal configuration that is different from the first signal configuration;
   wherein the first signal configuration is selected from the group consisting of a broadband transmission of frequencies overlapping those of the plurality of cellular base stations, a broadband transmission including a notch wherein a range of frequencies is attenuated, and a broadband transmission including a frequency subrange where essentially no transmission occurs.

2. A method for monitoring a cellular network on board an aircraft, comprising:
   providing a network control unit comprising a general control system operatively linked to a noise generation unit;
   generating a first noise signal using the noise generation unit, wherein the first noise signal has a first signal configuration;
   monitoring power supplied to or received from at least one of a plurality of on-board cellular base stations;
   identifying a loss of power supplied to or received from the at least one of a plurality of cellular base stations; and
   on identifying the loss of power supplied to or received from the at least one of a plurality of cellular base stations, generating via the noise generation unit a second noise signal having a second signal configuration that is different from the first signal configuration;
   wherein the second signal configuration is selected from the group consisting of a broadband transmission of frequencies overlapping those of the plurality of cellular base stations, a broadband transmission including a notch wherein a range of frequencies is attenuated, and a broadband transmission including a frequency subrange where essentially no transmission occurs.

3. The method of claim 1, wherein information related to power supplied to the at least one of a plurality of cellular base stations is directed to the noise generation unit.

4. The method of claim 1, wherein power received from the at least one of a plurality of cellular base stations is broadcast power.

5. The method of claim 4, wherein broadcast power is received from an antenna communicatively coupled to the noise generation unit.

6. A system for monitoring a cellular network on board an aircraft comprising:
   a network control unit comprising a general control system;
   a noise generation unit operatively linked to the network control unit, wherein the noise generation unit is configured to generate a first noise signal having a first signal configuration and a second noise signal having a second signal configuration;
   wherein one of the network control unit or noise generation unit comprises an algorithm configured to monitor power supplied to or received from at least one of a plurality of on-board cellular base stations, identify a loss of power supplied to or received from the at least one of a plurality of cellular base stations, and on identifying the loss of power supplied to or received from the at least one of a plurality of cellular base stations direct the noise generation unit to transition from the first noise signal to the second noise signal;

wherein the second signal configuration is selected from the group consisting of a broadband transmission of frequencies overlapping those of the plurality of cellular base stations, a broadband transmission including a notch wherein a range of frequencies is attenuated, and a broadband transmission including a frequency subrange where essentially no transmission occurs.

7. The system of claim 6, wherein the first signal configuration is selected from the group consisting of a broadband transmission of frequencies overlapping those of the plurality of cellular base stations, a broadband transmission including a notch wherein a range of frequencies is attenuated, and a broadband transmission including a frequency subrange where essentially no transmission occurs.

8. The system of claim 6, wherein information related to power supplied to the at least one of a plurality of cellular base stations is directed to the noise generation unit.

9. The system of claim 6, wherein power received from at least one of a plurality of cellular base stations is broadcast power.

10. The system of claim 9, further comprising an antenna configured to receive a transmission from the at least one of a plurality of cellular base stations, and wherein the antenna is communicatively coupled to the noise generation unit.

11. A system for monitoring a cellular network on board an aircraft comprising:

a network control unit comprising a general control system;

a noise generation unit operatively linked to the network control unit, wherein the noise generation unit is configured to generate a first noise signal having a first signal configuration and a second noise signal having a second signal configuration;

wherein one of the network control unit or noise generation unit comprises an algorithm configured to monitor power supplied to or received from at least one of a plurality of on-board cellular base stations, identify a loss of power supplied to or received from the at least one of a plurality of cellular base stations, and on identifying the loss of power supplied to or received from the at least one of a plurality of cellular base stations direct the noise generation unit to transition from the first noise signal to the second noise signal;

wherein information related to power supplied to the at least one of a plurality of cellular base stations is directed to the noise generation unit;

and wherein the first signal configuration is selected from the group consisting of a broadband transmission of frequencies overlapping those of the plurality of cellular base stations, a broadband transmission including a notch wherein a range of frequencies is attenuated, and a broadband transmission including a frequency subrange where essentially no transmission occurs.

12. The system of claim 11, wherein power received from at least one of a plurality of cellular base stations is broadcast power.

13. The system of claim 11, further comprising an antenna configured to receive a transmission from the at least one of a plurality of cellular base stations, and wherein the antenna is communicatively coupled to the noise generation unit.

* * * * *